US012789651B2

(12) United States Patent
Katsuya et al.

(10) Patent No.: US 12,789,651 B2
(45) Date of Patent: Nov. 10, 2026

(54) DRIVE UNIT

(71) Applicant: HONDA MOTOR CO., LTD., Tokyo (JP)

(72) Inventors: Jin Katsuya, Wako (JP); Tsutomu Kamiyamaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 246 days.

(21) Appl. No.: 18/744,740

(22) Filed: Jun. 17, 2024

(65) Prior Publication Data

US 2025/0026209 A1 Jan. 23, 2025

(30) Foreign Application Priority Data

Jul. 18, 2023 (JP) ................................. 2023-116538
Feb. 6, 2024 (JP) ................................. 2024-016482

(51) Int. Cl.

*B60L 5/12* (2006.01)
*B60L 53/122* (2019.01)
*B60L 53/53* (2019.01)
*B60L 53/60* (2019.01)

(52) U.S. Cl.

CPC ............. *B60L 53/122* (2019.02); *B60L 53/53* (2019.02); *B60L 53/60* (2019.02)

(58) Field of Classification Search

CPC ........ B60L 53/122; B60L 53/53; B60L 53/60; B60L 53/12; B60L 50/66; B60L 2240/54; B60K 1/04; B60K 2001/0438; H02J 50/10

See application file for complete search history.

(56) References Cited

U.S. PATENT DOCUMENTS

2016/0082847 A1* 3/2016 Asai ........................ B60L 53/38 307/10.1
2020/0047633 A1* 2/2020 Asai ........................ B60L 50/60
2024/0313578 A1* 9/2024 Katsuya .................. H02J 50/10

FOREIGN PATENT DOCUMENTS

DE 4320993 A1 * 1/1995 .............. B60L 53/80
JP H07215070 A * 8/1995 ............... B60K 1/04
JP 2019-092266 6/2019

* cited by examiner

*Primary Examiner* — Tisha D Lewis

(74) *Attorney, Agent, or Firm* — Amin, Turocy & Watson, LLP

(57) ABSTRACT

A drive unit includes a subsidiary frame, a power receiving device, an electrical storage device, an electric power control device, and a rotating electric machine. The subsidiary frame is fixed to a lower portion of a vehicle body. The power receiving device is disposed below the subsidiary frame and integrally fixed to the subsidiary frame. The power receiving device receives alternating current electric power transmitted from a power transmission device in a non-contact manner. The rotating electric machine is integrally fixed to the subsidiary frame. The electrical storage device and the electric power control device are integrally fixed to the rotating electric machine. The electrical storage device transmits and receives electric power to and from the rotating electric machine. The electric power control device controls electric power transmission and reception between the electrical storage device and the rotating electric machine.

3 Claims, 5 Drawing Sheets

DRIVE UNIT

CROSS-REFERENCE TO RELATED APPLICATION

Priority is claimed on Japanese Patent Application No. 2023-116538, filed Jul. 18, 2023 and Japanese Patent Application No. 2024-016482, filed Feb. 6, 2024, the contents of both of which are incorporated herein by reference.

BACKGROUND OF THE INVENTION

Field of the Invention

The present invention relates to a drive unit.

Description of Related Art

In recent years, in order to ensure that more people have access to affordable, reliable, sustainable, and advanced energy, research and development has been being conducted on charging power to and supplying electric power from vehicles equipped with secondary batteries that contribute to energy efficiency.

In the related art, in a non-contact electric power transmission system configured to supply electric power to a vehicle from outside of the vehicle through electric power transmission in a non-contact manner, a vehicle in which a battery, an inverter and a power reception coil are integrated with each other is known (for example, see Japanese Unexamined Patent Application, First Publication No. 2019-92266).

SUMMARY OF THE INVENTION

Incidentally, in technologies related to electric power charging to and supplying from vehicles with secondary batteries, it is desired to suppress increase in vehicle weight and installation volume of electric power units by minimizing increase in the capacity required for secondary batteries. For example, as in the vehicles in the related art, when assuming secondary use of a battery for electric power supply, a problem arises in that it becomes difficult to be able to reduce the capacity of the secondary battery.

In addition, since it is necessary to place a battery under a seat, which serves as an occupant space, there is a risk that the occupied space will deteriorate. In addition, since the battery is located outside of the occupant, a body structure becomes required to deal with collisions such as side collisions, which may lead to an increase in vehicle weight. In addition, cooling target objects having different heat resisting temperatures such as batteries, motors, gears, inverters, air-conditioning devices, and the like, are installed in various parts of the vehicle, resulting in a plurality of cooling paths becoming complicated, and the number of coolers becoming plural, which may increase the costs and weight.

An aspect of the present invention is directed to providing a drive unit capable of suppressing increase in weight and installation volume and contributing to energy efficiency.

The present invention employs the following aspects.

(1) A drive unit (for example, a drive unit (1) in an embodiment) according to an aspect of the present invention includes a frame-shaped subsidiary frame (for example, a subsidiary frame (2) in the embodiment) fixed to a lower portion of a vehicle body, a power receiving part (for example, a power receiving device (4) in the embodiment) that is disposed below the subsidiary frame and integrally fixed to the subsidiary frame, and that has a coil (for example, the coil 13 in the embodiment) configured to receive alternating current electric power transmitted from a power transmission device (for example, a power transmission device (T) in the embodiment) in a non-contact manner, a rotating electric machine (for example, a rotating electric machine (7) in the embodiment) integrally fixed to the subsidiary frame, and an electrical storage device (for example, an electrical storage device (5) in the embodiment) and an electric power controller (for example, an electric power control device (6) in the embodiment) integrally fixed to the rotating electric machine and configured to transmit and receive electric power to and from the rotating electric machine.

(2) In the drive unit according to the above-mentioned (1), the electrical storage device and the electric power controller may be integrally fixed to the rotating electric machine at upper side of the rotating electric machine.

(3) In the drive unit according to the above-mentioned (2), the electrical storage device may be disposed above the rotating electric machine and the electric power controller.

(4) In the drive unit according to any one of the above-mentioned (1) to (3), the power receiving part may include an inner member (for example, an inner member (17) in the embodiment) that is inserted into an air-core region (for example, an air-core region (13*a*) in the embodiment) of the coil and that is formed of a magnetic material protruding toward the rotating electric machine, and the inner member may include a frame-shaped wall portion (for example, a wall portion (17*a*) in the embodiment) penetrating in an upward/downward direction and a lid portion (for example, a lid portion (17*b*) in the embodiment) configured to open and close an opening end of the wall portion.

According to the aspect of the above-mentioned (1), an increase in capacity of the electrical storage device can be suppressed by setting the electric power received by the power receiving part from the power transmission device as a virtual SOC in addition to a state of charge (SOC) of the electrical storage device. By suppressing an increase in weight and volume of the electrical storage device, it becomes easy to integrate the electrical storage device, the electric power controller, the rotating electric machine and the power receiving part and fix them to the subsidiary frame. Since it is possible to adopt a simple cooling structure by integrating cooling target objects in one place, and a volume of a motor compartment can also be reduced, this allows freedom in selecting a vehicle structure due to the number of required heat exchangers being reduced. Due to the integration, for example, it is possible to suppress an increase in length and electric resistance loss of the required wiring, and it is possible to suppress occurrence of vibrations and vibration sound transmitted from the rotating electric machine to the outside. By suppressing an increase in weight and volume of the electrical storage device, it is possible to increase a passenger compartment space and a cargo compartment space. The body structure can be simplified by consolidating the side collision response to the electrical storage device on the passenger compartment side into the collision response to the motor compartment.

In the case of the aspect of the above-mentioned (2) or (3), it is possible to improve diversity and easiness of layout of the electrical storage device, the electric power controller and the rotating electric machine. By being able to integrate the cooler, it is possible to adopt a free design, such as shortening the nose and reducing the opening, even though it is a front engine front drive (FF) vehicle.

In the case of the aspect of the above-mentioned (4), by opening the lid portion of the inner member, various devices and members placed in other spaces leading to a hollow internal space surrounded by the wall portion can be easily exposed to the outside, and the ease of various maintenance can be improved. For example, maintenance such as visual checking and exchange of oils and fats for drive units or the like installed in the subsidiary frame can be easily performed through the internal space of the wall portion of the inner member.

DETAILED DESCRIPTION OF THE INVENTION

Hereinafter, a drive unit according to an embodiment of the present invention will be described with reference to the accompanying drawings.

Figure 1:
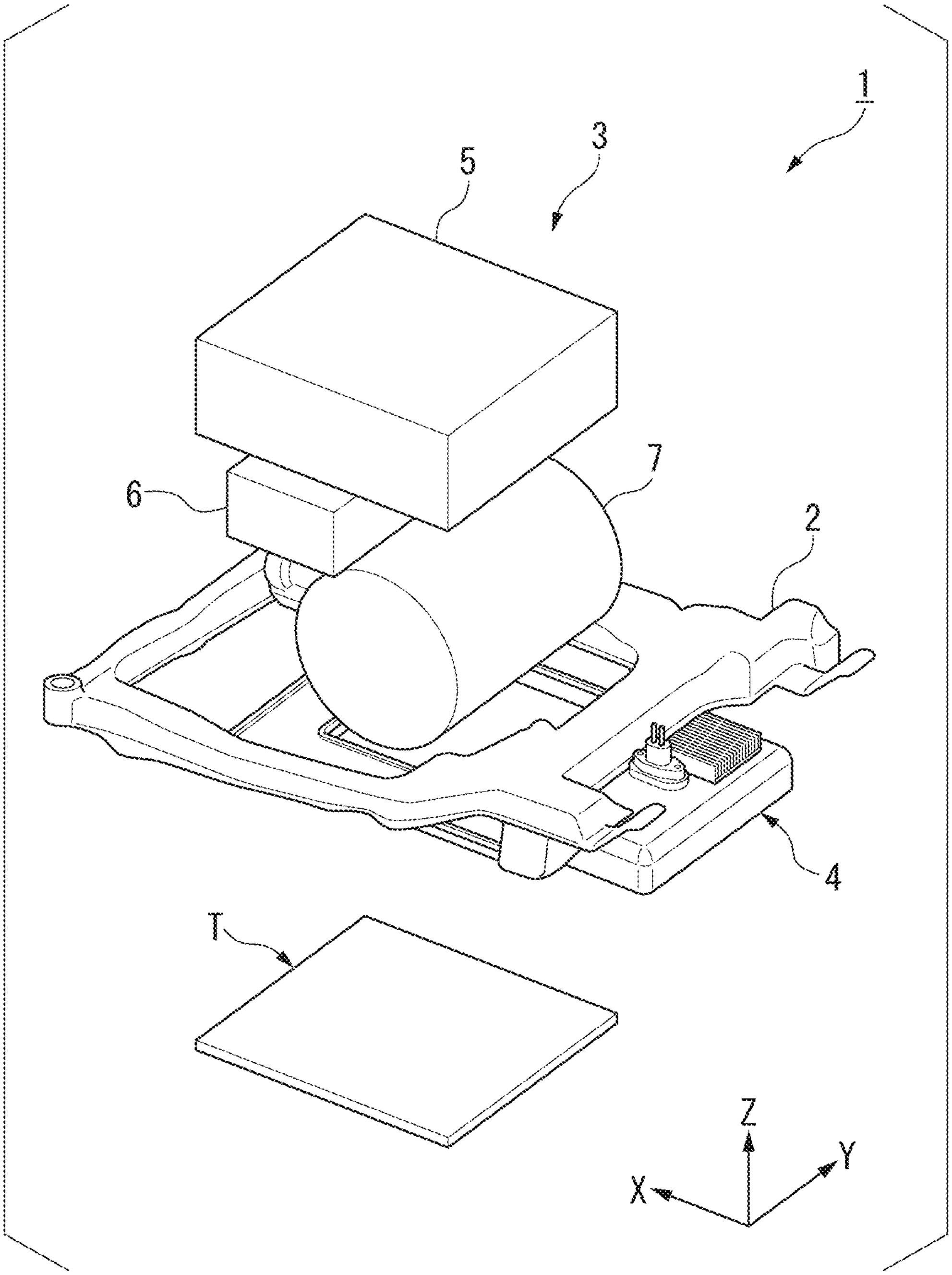
FIG. 1 is a perspective view showing a configuration of a drive unit according to an embodiment of the present invention.
Figure 2:
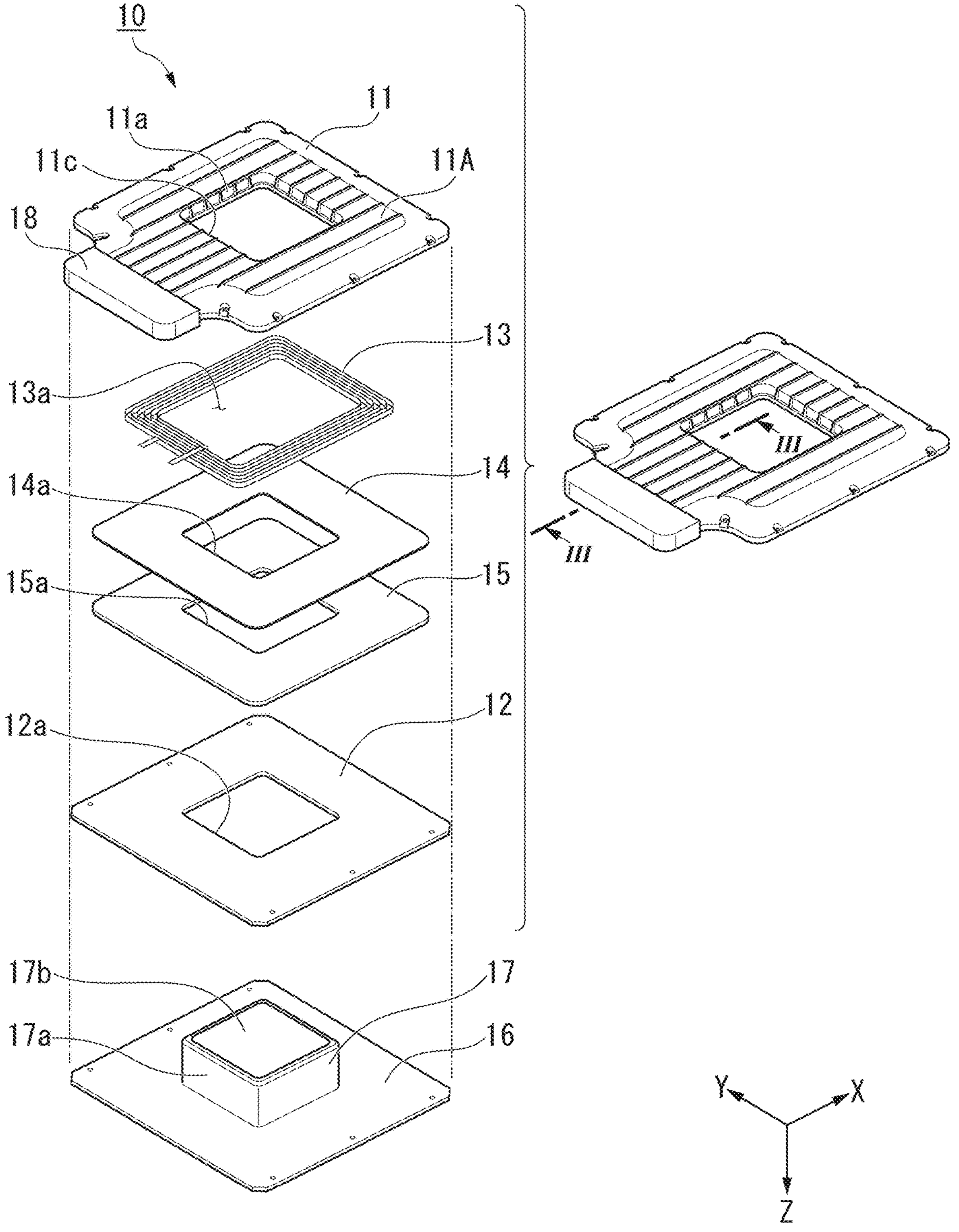
FIG. 2 is an exploded perspective view showing a configuration of a coil unit according to the embodiment of the present invention.
Figure 3:
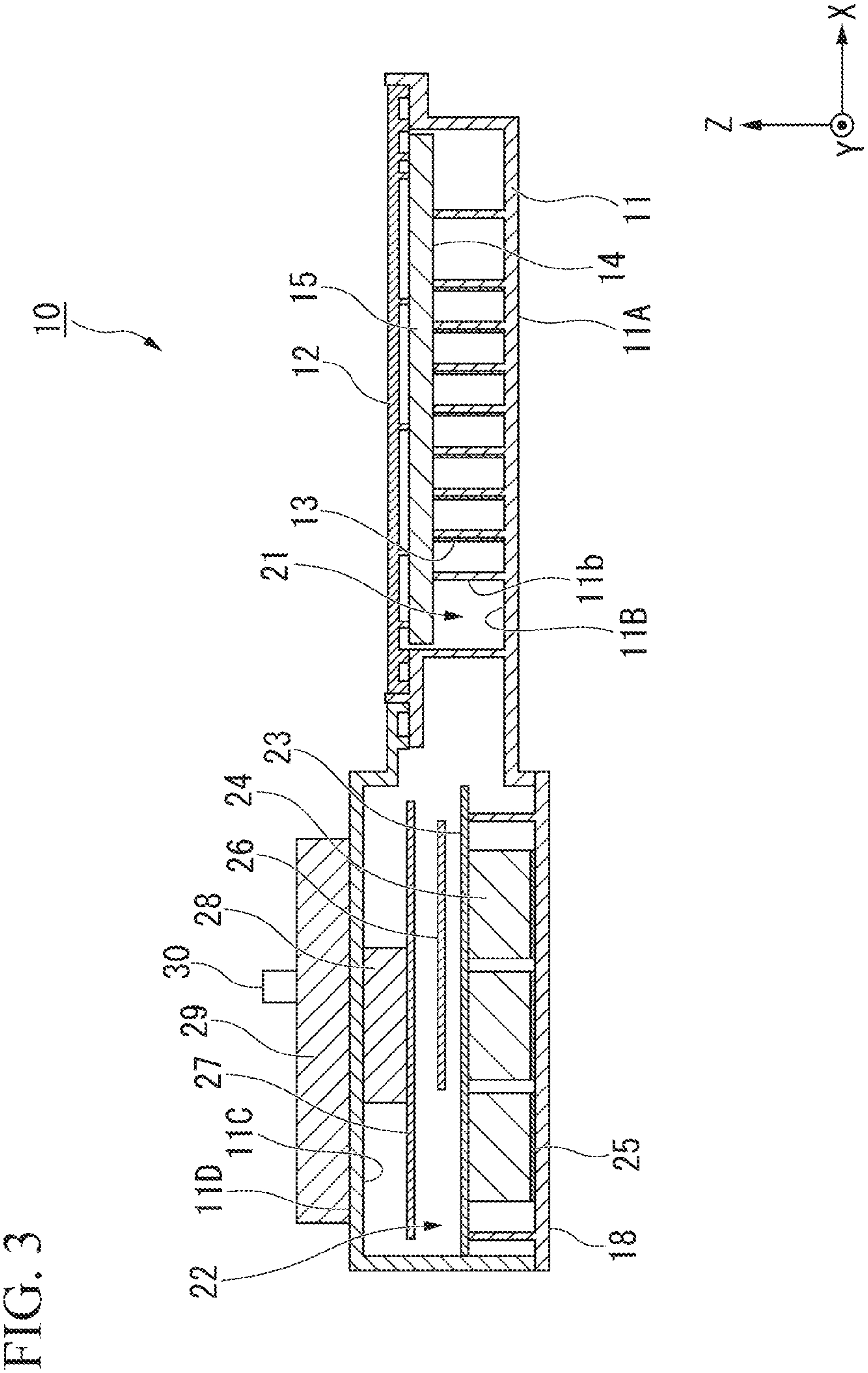
FIG. 3 is a cross-sectional view showing the coil unit according to the embodiment of the present invention cut along a Z-X plane at a position of line III-III shown in FIG. 2.

FIG. 1 is a perspective view showing a configuration of a drive unit 1 according to the embodiment. FIG. 2 is an exploded perspective view showing a configuration of a coil unit 10 according to the embodiment. FIG. 3 is a cross-sectional view showing the coil unit 10 according to the embodiment cut along a Z-X plane at a position of line III-III shown in FIG. 2.

Hereinafter, respective axial directions of an X axis, a Y axis and a Z axis perpendicular to each other in a 3-dimensional space are directions parallel to the respective axes. For example, as shown in FIG. 1 to FIG. 3, the Z-axis direction is parallel to an upward/downward direction of a moving body such as a vehicle or the like in which the drive unit 1 is mounted, the X-axis direction is parallel to an forward/rearward direction of the moving body, and the Y-axis direction is parallel to a leftward/rightward direction of the moving body. For example, a positive direction of the Z axis is an upward direction of the moving body, a positive direction of the X axis is a forward direction of the moving body, and a positive direction of the Y axis is a rightward direction of the moving body.

The drive unit 1 of the embodiment is mounted on the vehicle that receives electric power from the outside through, for example, electric power transmission in a non-contact manner. The vehicle is an electrically driven vehicle, for example, an electric vehicle, a hybrid vehicle, a fuel cell vehicle, or the like.

As shown in FIG. 1, the drive unit 1 includes a subsidiary frame 2, a drive control device 3 and a power receiving device 4, which are provided integrally. For the frame-shaped subsidiary frame 2 provided on a lower portion of a vehicle body, for example, the drive control device 3 is fixed to an upper portion of the subsidiary frame 2, and the power receiving device 4 is fixed to a lower portion of the subsidiary frame 2.

The subsidiary frame 2 is, for example, a front subsidiary frame fixed to a lower portion of the vehicle body and on which a drive unit, a front suspension, and the like, are mounted. An external form of the subsidiary frame 2 is, for example, a frame shape. The subsidiary frame 2 is formed of, for example, steel structure (SS) and steel carbon (SC), or a steel material having a smaller R component of complex permeability than steel structure (SS) and the steel carbon (SC) (i.e., a material having iron as a main component), such as steel plate cold commercial (SPCC) or the like. The subsidiary frame 2 is formed of, for example, a steel material having relatively small iron loss (a material in which a plurality of materials are mixed such that iron loss can be reduced). When formed of SS or SC, in order to suppress an increase in internal loss, the subsidiary frame 2 is configured to prevent magnetic flux from penetrating therethrough by disposing a large amount of magnetic material such as ferrite or the like.

The drive control device 3 includes, for example, an electrical storage device 5, an electric power control device 6, and a rotating electric machine 7.

The electrical storage device 5 is disposed above, for example, the electric power control device 6 and the rotating electric machine 7. The electrical storage device 5 includes, for example, a high voltage battery that is a power source for a vehicle. The electrical storage device 5 includes, for example, a box-shaped battery case, and a plurality of battery modules disposed in the battery case. The battery module includes a plurality of battery cells connected in series or in parallel. The electrical storage device 5 is charged by electric power transmitted from a power transmission device T outside the vehicle in a non-contact manner. The electrical storage device 5 transmits and receives electric power to and from the rotating electric machine 7 via the electric power control device 6.

The electric power control device 6 is disposed, for example, between the electrical storage device 5 and the rotating electric machine 7. The electric power control device 6 includes, for example, a box-shaped case, and an electric power conversion module disposed in the case. The electric power conversion module includes, for example, a bridge circuit constituted by a plurality of switching elements and rectifying elements bridge-connected with 3 phases or the like. Each switching element is, for example, a transistor such as an insulated gate bipolar transistor (IGBT), a metal oxide semi-conductor field effect transistor (MOSFET) of silicon carbide (SiC), or the like. The rectifying element is, for example, a reflux diode connected to each transistor in parallel. The electric power control device 6 controls, for example, electric power transmission and reception between the electrical storage device 5 and the rotating electric machine 7 by electric power conversion in both directions between the direct current electric power and alternating current electric power.

The rotating electric machine 7 is disposed, for example, above the subsidiary frame 2, and is fixed to the subsidiary frame 2 integrally. The rotating electric machine 7 is disposed, for example, below the electrical storage device 5 and the electric power control device 6, and is fixed to the electrical storage device 5 and the electric power control device 6 integrally. The rotating electric machine 7 includes, for example, a tubular housing, and a motor disposed in the housing. The motor is, for example, a brushless DC motor for 3-phase alternating current or the like provided for traveling of the vehicle. The motor generates a rotational driving force be being power-operated using the electric power supplied from the electric power control device 6. The motor may generate electric power, for example, by being regeneration-operated by a rotational power input from a wheel side of the vehicle. The motor may generate electricity using power of the internal combustion engine when the motor can be connected to the internal combustion engine of the vehicle.

The power receiving device 4 is disposed, for example, below the subsidiary frame 2 and integrally fixed to the subsidiary frame 2. The power receiving device 4 includes the coil unit 10. The coil unit 10 constitutes a part of the power receiving device 4 that receives alternating current electric power from the external power transmission device T through electric power transmission in a non-contact manner.

As shown in FIG. 2 and FIG. 3, the coil unit 10 includes, for example, a housing 11, a first cover 12, a coil 13, an insulating member 14, a core member 15, a back member 16, an inner member 17, and a second cover 18.

An external form of the housing 11 is, for example, a rectangular frame shape. The housing 11 is formed of, for example, a material such as a resin or the like having a predetermined thermal conductivity. The housing 11 includes, for example, a first accommodating part 21 and a second accommodating part 22. The coil 13, the insulating member 14 and the core member 15, which will be described below, are disposed in the first accommodating part 21. Boards 23, 26 and 27, a capacitor 24 and a semiconductor element 28, which will be described below, are disposed in the second accommodating part 22. For example, the first accommodating part 21 is provided so as to surround a lower side in the upward/downward direction and an inner side and an outer side in a direction perpendicular to the upward/downward direction with respect to the coil 13, the insulating member 14 and the core member 15, which will be described below. The second accommodating part 22 is provided, for example, behind the first accommodating part 21 in the forward/rearward direction. For example, the second accommodating part 22 is provided so as to surround an upper side in the upward/downward direction and an outer side in a direction perpendicular to the upward/downward direction with respect to the boards 23, 26 and 27, the capacitor 24 and the semiconductor element 28, which will be described below.

The housing 11 includes, for example, a first surface 11A in which a plurality of grooves 11*a* is formed in the first accommodating part 21. The first surface (i.e., a lower surface that is a surface on a lower side in the upward/downward direction) 11A of the housing 11 is exposed to the outside below the vehicle body. The plurality of grooves 11*a* are formed along a flow direction of wind received upon traveling of the vehicle (traveling wind), for example, along the forward/rearward direction.

The housing 11 includes, for example, a plurality of heat radiating members 11*b* protruding inward from a first inner surface 11B on the back side with respect to the first surface 11A. An external form of the heat radiating members 11*b* is, for example, a plate-shaped fin type. The plurality of heat radiating members 11*b* are in contact with the coil 13.

An external form of the first cover 12 is, for example, a rectangular plate shape in which a through-hole 12*a* is formed in a thickness direction. For example, the first cover 12 is provided so as to surround an upper side in the upward/downward direction with respect to the coil 13, the insulating member 14 and the core member 15, which will be described below. The first cover 12 forms an accommodating space in which the coil 13, the insulating member 14 and the core member 15 are accommodated between the first cover 12 and the first inner surface 11B of the housing 11. The first cover 12 closes an opening end of the first accommodating part 21 of the housing 11 in which the coil 13, the insulating member 14 and the core member 15 are accommodated. Further, for example, the first cover 12 may be formed to ensure thermal conductivity by being cast with a thermal conductive resin.

An external form of the coil 13 is, for example, a rectangular spiral shape formed along the first inner surface 11B of the housing 11. The coil 13 is disposed, for example, above the first inner surface 11B. An element wire of the coil 13 is in direct contact with the plurality of heat radiating members 11*b*.

An external form of the insulating member 14 is, for example, a rectangular sheet shape in which a through-hole 14*a* is formed in a thickness direction. The insulating member 14 is formed of a material having electrical insulation. The insulating member 14 is disposed, for example, above the coil 13.

An external form of the core member 15 is, for example, a rectangular plate shape in which a through-hole 15*a* is formed in a thickness direction. The core member 15 is formed of, for example, a magnetic material having large magnetic permeability and small iron loss within a predetermined bandwidth (85 kH bandwidth or the like), for example, a magnetic material with non-directivity (isotropy) such as ferrite or the like, an electromagnetic steel sheet such as a silicon steel sheet or the like, or a magnetic material with directivity (anisotropy) of a soft magnetic material such as a nanocrystal soft magnetic material or the like. The core member 15 is disposed, for example, above the insulating member 14.

An external form of the back member 16 is, for example, a rectangular plate shape in which a through-hole is formed in a thickness direction. An external form of the inner member 17 is, for example, a box shape including a wall portion 17*a* formed in a rectangular frame shape and penetrating in the upward/downward direction, and a lid portion 17*b* configured to close a lower portion opening end of the wall portion 17*a*. For example, the inner member 17 protrudes downward in the upward/downward direction from a circumferential edge portion that surrounds the through-hole of the back member 16. The back member 16 and the inner member 17 are integrally formed of, for example, a magnetic material having large magnetic permeability, such as a nanocrystal soft magnetic material sheet, or an electromagnetic steel sheet such as a ferrite or silicon steel sheet with anti-scattering treatment using an epoxy resin.

The back member 16 is disposed, for example, above the first cover 12 in the upward/downward direction. The inner member 17 is inserted into, for example, the through-holes 12*a*, 15*a* and 14*a* of the first cover 12, the core member 15 and the insulating member 14, an air-core region 13*a* of the coil 13, and a through-hole 11*c* of the housing 11 in the thickness direction. For example, the inner member 17 protrudes downward from the first surface 11A of the housing 11.

An external form of the second cover 18 is, for example, a rectangular plate shape. The second cover 18 is provided, for example, so as to surround a lower side in the upward/downward direction with respect to the boards 23, 26 and 27, the capacitor 24 and the semiconductor element 28, which will be described below. The second cover 18 forms an accommodating space in which the boards 23, 26 and 27, the capacitor 24 and the semiconductor element 28 are accommodated between the second cover 18 and a second inner surface 11C of the second accommodating part 22 of the housing 11. The second cover 18 closes an opening end of the second accommodating part 22 of the housing 11 in which the boards 23, 26 and 27, the capacitor 24 and the semiconductor element 28 are accommodated.

The capacitor board 23 fixes the plurality of capacitors 24, for example, film capacitors or the like. The capacitor 24 is, for example, a capacitor (condenser) for resonance or the like connected to the coil 13. The plurality of capacitors 24 are fixed to the capacitor board 23, and are in contact with an inner surface of the second cover 18 via, for example, a thermal conductive member 25 such as thermal compound or the like.

The control board 26 is disposed, for example, above the capacitor board 23. The control board 26 controls, for example, electric power conversion of the power receiving device and communication with the power transmission device T of the outside. The control board 26 is a software function part functioned by executing a predetermined program using a processor such as a central processing unit (CPU) or the like. The software function part is an electronic control unit (ECU) including a processor such as a CPU or the like, a read only memory (ROM) in which a program is stored, a random access memory (RAM) in which data is temporarily stored, and an electronic circuit such as a timer or the like. Further, at least a part of the control board 26 may be an integrated circuit such as large scale integration (LSI) or the like.

The control board 26 generates, for example, a control signal which is input to the gate drive board 27 according to a target output or the like of a power receiving device. The control signal is, for example, a signal that indicates timing for driving on (conducting electricity)/off (blocking electricity) the plurality of switching elements that constitute the electric power conversion part of the power receiving device. For example, the control signal is a pulse-width-modulated signal or the like.

The gate drive board 27 is disposed, for example, above the control board 26. The gate drive board 27 is connected to, for example, gates of the plurality of switching elements that constitute the electric power conversion part of the power receiving device. The gate drive board 27 includes, for example, an integrated circuit, a plurality of gate resistors, and the like.

The gate drive board 27 generates a gate signal for driving on (conducting electricity)/off (blocking electricity) each switching element in actuality on the basis of the control signal received from the control board 26. For example, the gate drive board 27 generates a gate signal by executing amplification and level shifting of the control signal.

The semiconductor element 28 is, for example, a switching element, a rectifying element, and the like, that constitute the electric power conversion part of the power receiving device 4. The switching element is, for example, a transistor such as a metal oxide semi-conductor field effect transistor (MOSFET) of silicon carbide (SiC) or the like. The rectifying element is, for example, a reflux diode connected to each transistor in parallel. The plurality of semiconductor elements 28 is fixed to, for example, an upper portion of the gate drive board 27, and disposed between the gate drive board 27 and the second inner surface 11C of the housing 11.

The housing 11 includes a radiator 29 disposed on an outer surface (second surface) 11D opposite to the second inner surface 11C. The radiator 29 includes, for example, a water jacket by a water cooling structure, a heat sink having a plurality of fin members protruding outward, and the like.

The housing 11 includes, for example, a direct current connector 30 connected to the electric power conversion part of the power receiving device 4 and protruding outward (upward) from the second surface 11D.

As described above, according to the drive unit 1 of the embodiment, in addition to a state of charge (SOC) of the electrical storage device 5, the electric power received by the power receiving device 4 from the power transmission device T is used as a virtual SOC, and thus, it is possible to suppress an increase in capacity of the electrical storage device 5. By suppressing the increase in weight and volume of the electrical storage device 5, the electrical storage device 5, the electric power control device 6, the rotating electric machine 7 and the power receiving device 4 can be easily integrated and fixed to the subsidiary frame 2. Due to the integration, for example, it is possible to suppress an increase in the required wiring length and electric resistance loss, and also to suppress generation of vibrations and vibration sound transmitted from the rotating electric machine 7 to the outside. It is possible to increase a passenger compartment space and a cargo compartment space by suppressing the increase in weight and volume of the electrical storage device 5. It is possible to improve diversity and easiness of layout of the electrical storage device 5, the electric power control device 6 and the rotating electric machine 7.

(Variant)

Further, in the above-mentioned embodiment, while the subsidiary frame 2 is a front subsidiary frame, there is no limitation thereto, and for example, it may be a rear subsidiary frame. That is, the drive control device 3 and the power receiving device 4 may be integrally fixed to the rear subsidiary frame.

Further, in the above-mentioned embodiment, the lid portion 17*b* of the inner member 17 may be provided to be openable and closable or removable relative to the wall portion 17*a*.

Figure 4:
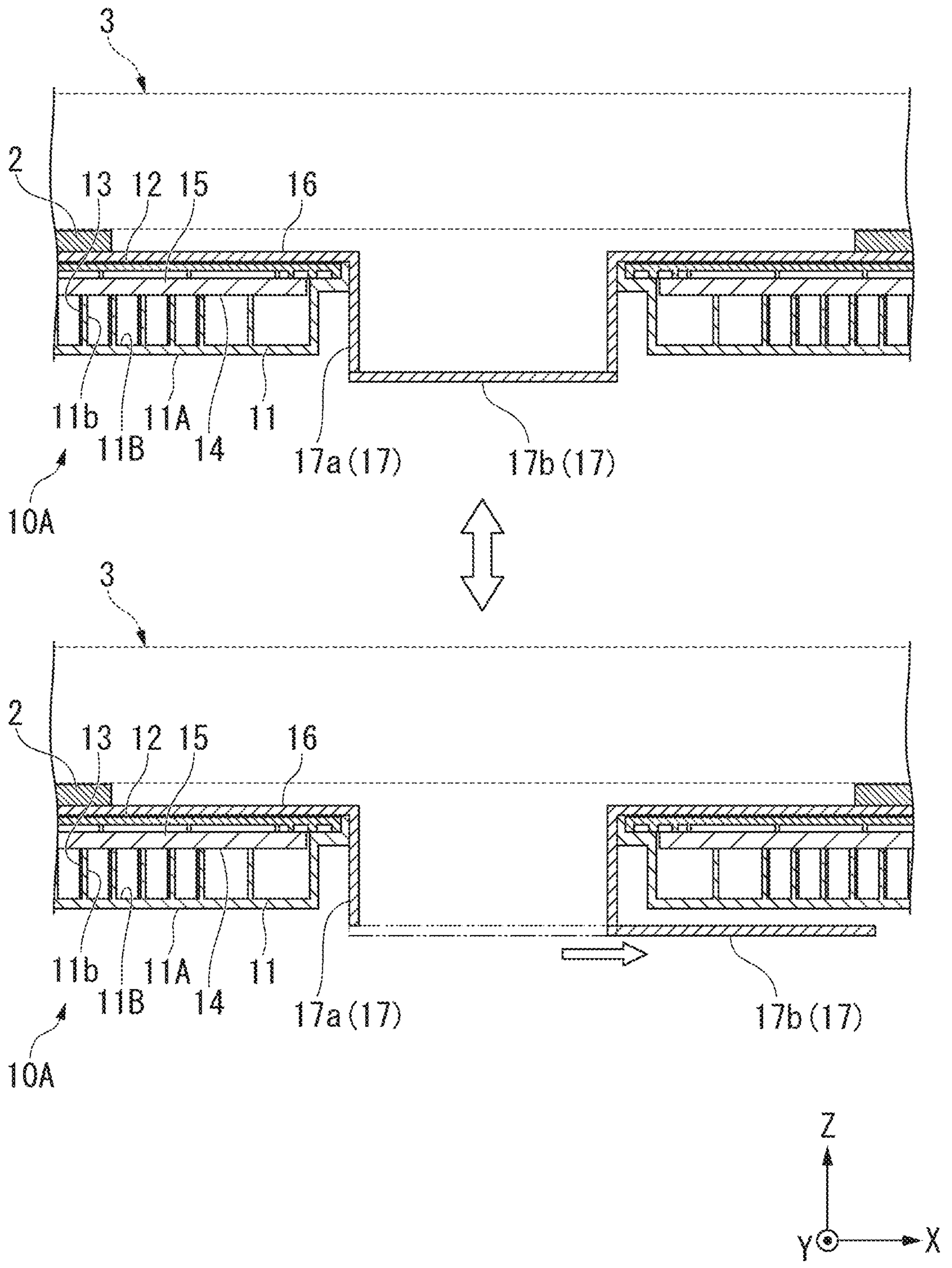
FIG. 4 is a cross-sectional view of a coil unit according to a first variant of the embodiment of the present invention.

FIG. 4 is a cross-sectional view of a coil unit 10A according to a first variant of the embodiment.

As shown in FIG. 4, in the coil unit 10A of the first variant, the lid portion 17*b* of the inner member 17 opens and closes a lower opening end of the wall portion 17*a* by being slid with respect to the wall portion 17*a* using, for example, a slide mechanism or the like.

Figure 5:
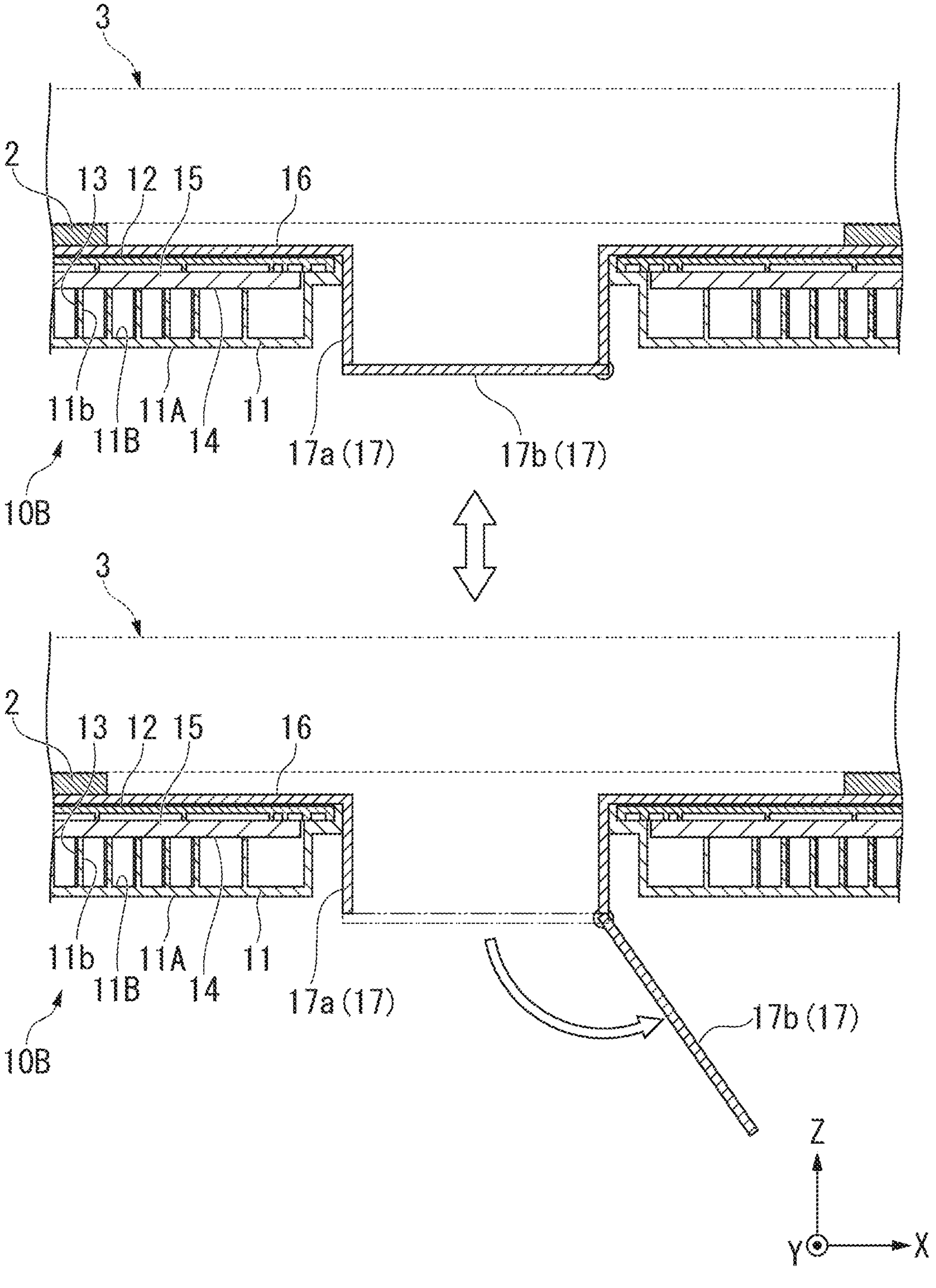
FIG. 5 is a cross-sectional view of a coil unit according to a second variant of the embodiment of the present invention.

FIG. 5 is a cross-sectional view of a coil unit 10B according to a second variant of the embodiment.

As shown in FIG. 5, in the coil unit 10B of the second variant, the lid portion 17*b* of the inner member 17 opens and closes the lower opening end of the wall portion 17*a* by being rotated with respect to the wall portion 17*a* using, for example, a so-called hatch structure or the like.

According to the above-mentioned first or second variant, various devices and members disposed in another space can be easily exposed to the outside through a hollow internal space surrounded by the wall portion 17*a* by opening and closing the lid portion 17*b* of the inner member 17, and easiness of various maintenances can be improved. For example, visual checking of the drive control device 3 of the drive unit or the like mounted on the subsidiary frame 2 and maintenance of an exchange or the like of oils and fats can be easily executed through an internal space of the wall portion 17*a* of the inner member 17.

Further, for example, an undercover of a structure fastened by a one-touch clip or a half lock bolt and removable in the upward/downward direction may be provided as the lid portion 17*b*. According to these variants, since the magnetic material structure is a three-dimensional structure and can be opened and closed, for example, it is possible to check oil and fat bolt connections and oil leaks during inspection of completed vehicles, and to secure maintenance holes when exchanging oils and fats at dealers.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A drive unit comprising:

a frame-shaped subsidiary frame fixed to a lower portion of a vehicle body;

a power receiving part that is disposed below the subsidiary frame and integrally fixed to the subsidiary frame, and that has a coil configured to receive alternating current electric power transmitted from a power transmission device in a non-contact manner;

a rotating electric machine integrally fixed to the subsidiary frame; and an electrical storage device and an electric power controller integrally fixed to the rotating electric machine, the electrical storage device and the electric power controller transmit and receive electric power to and from the rotating electric machine, wherein the electrical storage device and the electric power controller are integrally fixed to the rotating electric machine at upper side of the rotating electric machine.

2. The drive unit according to claim 1, wherein the electrical storage device is disposed above the rotating electric machine and the electric power controller.

3. The drive unit according to claim 1, wherein the power receiving part includes an inner member that is inserted into an air-core region of the coil and that is formed of a magnetic material protruding toward the rotating electric machine, and the inner member includes a frame-shaped wall portion penetrating in an upward/downward direction and a lid portion configured to open and close an opening end of the wall portion.

* * * * *